(12) United States Patent
Irish et al.

(10) Patent No.: US 11,686,862 B2
(45) Date of Patent: Jun. 27, 2023

(54) INFERRING VEHICLE LOCATION AND MOVEMENT USING SENSOR DATA FUSION

(71) Applicant: Uber Technologies, Inc., San Francisco, CA (US)

(72) Inventors: Andrew Irish, Mountain View, CA (US); Dinesh Ramasamy, Mountain View, CA (US); Andrew Joseph Beinstein, San Francisco, CA (US); Theodore Russell Sumers, Montrose, NY (US); Hemabh Shekar, Los Gatos, CA (US); Vivek Sankaravadivel, Fremont, CA (US)

(73) Assignee: Uber Technologies, Inc., San Francisco, CA (US)

( * ) Notice: Subject to any disclaimer, the term of this patent is extended or adjusted under 35 U.S.C. 154(b) by 585 days.

(21) Appl. No.: 16/721,505

(22) Filed: Dec. 19, 2019

(65) Prior Publication Data

US 2020/0200920 A1 Jun. 25, 2020

Related U.S. Application Data

(60) Provisional application No. 62/930,772, filed on Nov. 5, 2019, provisional application No. 62/782,179, filed on Dec. 19, 2018.

(51) Int. Cl.
*G01S 19/47* (2010.01)
*G01C 21/28* (2006.01)
*G06Q 10/0631* (2023.01)
*G06N 5/04* (2023.01)
*G01C 21/34* (2006.01)

(52) U.S. Cl.
CPC .............. *G01S 19/47* (2013.01); *G01C 21/28* (2013.01); *G01C 21/3438* (2013.01); *G06N 5/04* (2013.01); *G06Q 10/06311* (2013.01)

(58) Field of Classification Search
CPC ..... G01S 19/47; G01C 21/28; G01C 21/3438; G06N 5/04; G06Q 10/06311
See application file for complete search history.

(56) References Cited

U.S. PATENT DOCUMENTS 6,205,401 B1 * 3/2001 Pickhard .............. G01C 21/165
701/472
2013/0054130 A1 * 2/2013 Ye ......................... G06F 3/0383
701/500

* cited by examiner

*Primary Examiner* — Tyler J Lee
*Assistant Examiner* — Yufeng Zhang
(74) *Attorney, Agent, or Firm* — Fenwick & West LLP

(57) ABSTRACT

A network system, such as a transport management system, infers movement and a location of a vehicle associated with a transportation service using sensor data from a provider client device and a wireless device mounted in a fixed position in the vehicle. Before or during a transportation service, the provider client device transmits sensor data to the network system for use in detecting the occurrence of one or more specified events, such as a sudden deceleration or a harsh turn. The network system fuses the received sensor data to infer the movement of the vehicle along forward, lateral, and vertical axes and implements an event detector by analyzing movement of the vehicle in the forward direction. Fused sensor data received from the wireless device is used to validate the detected movement and to determine a position of the vehicle.

12 Claims, 7 Drawing Sheets

INFERRING VEHICLE LOCATION AND MOVEMENT USING SENSOR DATA FUSION

CROSS REFERENCE TO RELATED APPLICATIONS

This application claims the benefit of U.S. Provisional Application Nos. 62/782,179, filed Dec. 19, 2018 and 62/930,772, filed Nov. 5, 2019, both of which are incorporated by reference in their entirety.

BACKGROUND

The described embodiments generally relate to the field of network systems, and, more particularly, to inferring vehicle location and movement using fused sensor data from a provider client device and from a wireless device mounted in a fixed position in the vehicle.

May systems use global positioning system (GPS) coordinates to estimate the position of persons carrying client devices. For example, a person carrying a client device (referred to herein as a "user" or a "rider") may wish to arrange transportation from a present location to another location and may execute a transportation or ridesharing application on his or her client device to obtain transportation from a transportation service provider (such as a driver or an autonomous vehicle). Existing systems in this scenario match a user with a provider, instruct the provider to travel to a location of the user for pickup, and monitor the location of the provider as the provider travels to the pickup location. However, the GPS coordinates from a provider device that are used to estimate the position of the provider may be unknown or inaccurate due to interference or reception problems, such as those caused in geographic areas with tall buildings that distort satellite signals (referred to herein as "urban canyons"), for example. Additionally, GPS data may be unavailable in certain areas, like tunnels or stacked roads, such that the position of the vehicle appears to remain at the entrance to the tunnel until the vehicle exits the tunnel. This erroneous GPS data may cause inconveniences for the provider in attempting to locate the user for pickup and may also result in poor estimated times of arrival (ETA) associated with the transportation service and difficulty for the user in locating the provider.

Sensor data from client devices may further be used to infer vehicle movement. Globally, there are approximately 1.3 million collision-related fatalities on the road every year. Crash fatalities are the leading cause of death for people between 15 and 29 years old, impacting families, communities, and cities. Governments around the world are working to reduce the risks, committing more resources toward improving road safety.

Detecting harsh vehicle movements, such as sudden decelerations and sharp turns, may be a useful tool in identifying potential collisions and ensuring a rapid response to minimize damage to person and property. Conventional approaches to inferring vehicle movement rely on speed data gathered from a smartphone or other device in the vehicle and assume that all motion is exclusively in the forward direction, using the difference in speed between consecutive GPS samples to derive acceleration. However, this approach is susceptible to GPS positioning noise and is constrained by the low sampling rate of GPS (at most, once per second, and often slower). An alternative method uses inertial sensors, such as an accelerometer and a gyroscope, which together comprise an inertial measurement unit (IMU). These signals can be collected at higher frequencies than GPS and therefore capture events that occur over smaller timescales. However, this method presents its own challenges. For example, smartphone sensors vary across devices such that raw sensor data will look different on different device models. Additionally, some smartphones have only a partial IMU (e.g., an accelerometer, but no gyroscope). Finally, the smartphone may not be rigidly mounted in the vehicle, and even if the smartphone is mounted, the configuration of the mount may introduce significant vibration and generate unreliable signals.

SUMMARY

To enable more accurate determinations of vehicle movement and location, a network system fuses sensor data received from a provider client device and from a wireless device mounted in a fixed position in a provider vehicle. Before or during a transportation service provided by the provider to a user of the network system, a provider client device transmits sensor data to the network system for use in detecting the occurrence of one or more specified events, such as a sudden deceleration or harsh turn. Modules of the network system infer the movement of the vehicle along forward, lateral, and vertical axes and implement an event detector by analyzing movement of the vehicle in the forward direction.

In one embodiment, the sensor data transmitted by the provider client device includes global positioning system (GPS) data indicating a location of the provider client device, accelerometer data indicating an amount of acceleration of the provider client device, and gyroscope data indicating the device turn rate (the accelerometer and gyroscope collectively referred to as an inertial measurement unit (IMU)). A sensor fusion module estimates an amount of gravitational force experienced by the provider client device and subtracts the estimated force from the accelerometer reading to align a vertical axis of the provider client device with a vertical axis of the vehicle. The sensor fusion module additionally aligns the forward and lateral axes of the provider client device and the vehicle using sensor fusion to combine data obtained from the GPS and the IMU (e.g., using a Kalman filter algorithm). Responsive to inferring the movement of the vehicle along the axes, the sensor fusion module transmits vehicle movement data to an event detection module, which monitors the received data to detect the occurrence of one or more specified events and triggers a response flow associated with a detected event.

The network system validates the accuracy of the vehicle movement algorithm using sensor data received from a wireless device (a "beacon") located at a fixed position in the vehicle. In one embodiment, the beacon sensor data includes readings from beacon inertial sensors. A sensor validation module computes and subtracts a gravity estimation from the raw IMU sensor data and performs principal component analysis on the data to derive the vehicle movement. Additionally, in one embodiment, the sensor validation module uses the beacon gyroscope data to determine a direction of motion of the vehicle.

The network system additionally uses fused beacon sensor data to determine a location of the provider vehicle. In one embodiment, beacon sensor data used to determine a vehicle location includes global navigation satellite sensor (GNSS) signals that indicate location and velocity of the vehicle, accelerometer and gyroscope sensor data, and barometer sensor data that measures an amount of ambient pressure of the vehicle and indicates the vehicle altitude. The sensor fusion module fuses the GNSS, IMU, and barometer sensor data in a common reference frame using a tightly coupled sensor fusion architecture. In embodiments where the network system determines a vehicle position before the transportation service has begun (i.e., before the provider has picked up a rider), the location detection module can use the detected vehicle location to recommend a pickup location for the transportation service and/or to generate or update an ETA of the vehicle based on the determined vehicle position. Fusing the sensor data thus provides a more accurate estimation of vehicle location and movement compared to prior art approaches that rely on data from a single sensor.

DETAILED DESCRIPTION

The Figures and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
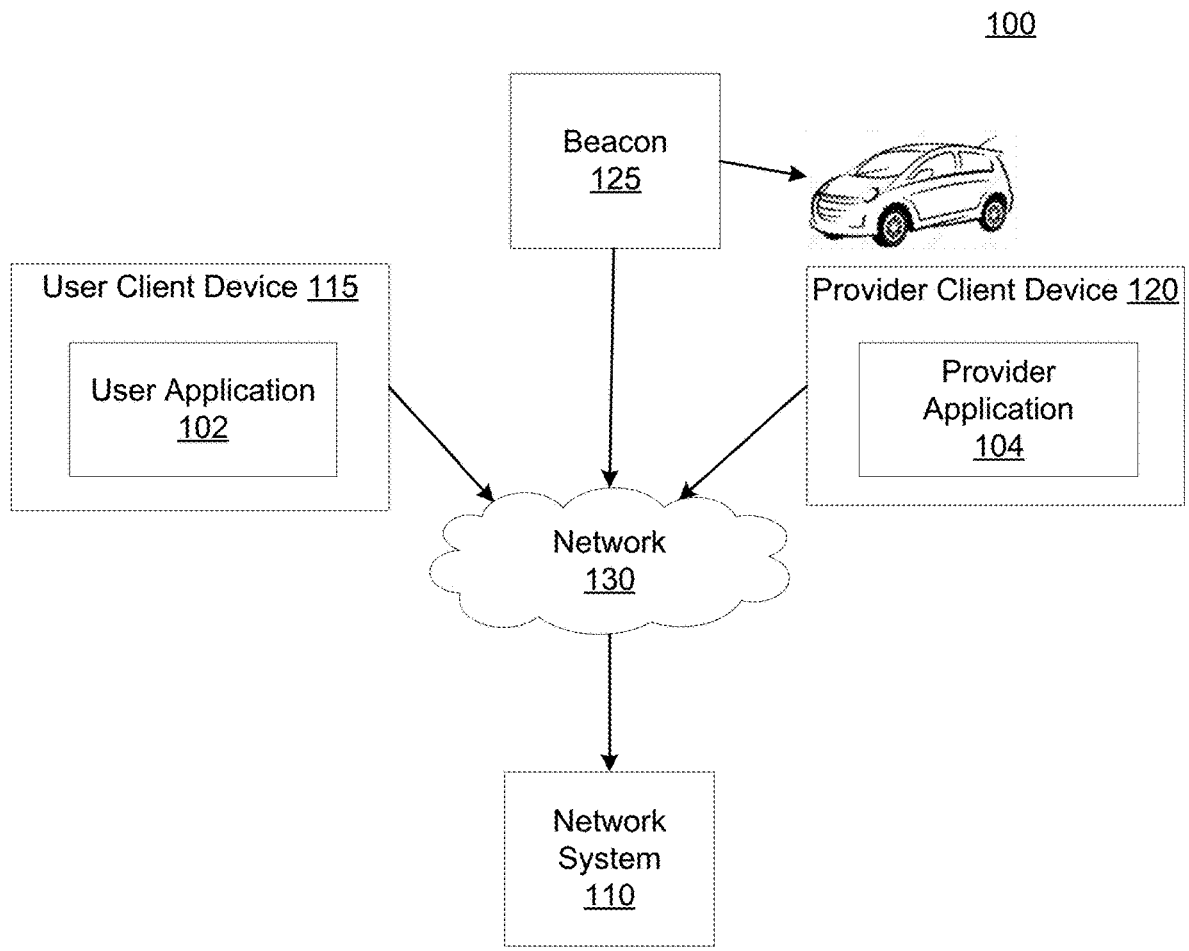
FIG. 1 is a block diagram illustrating the system environment for an example network system, in accordance with an embodiment.

Turning now to the specifics of the system architecture, FIG. 1 illustrates a system environment 100 for an example network system 110. The network system 110 coordinates the transportation of persons and/or goods/items for a user (e.g., such as a rider) by a service provider (e.g., a driver of a vehicle or an autonomous vehicle). The provider uses a vehicle to provide the transportation to the user. In the example embodiment shown in FIG. 1, the system architecture includes the network system 110, a user client device 115, a provider client device 120, and a fixed wireless device 125 (referred to herein as a "beacon") mounted in a provider vehicle. The various entities shown in FIG. 1 are connected via a network 130. In other embodiments, different and/or additional entities may be included in the system architecture 100.

A user operates a user client device 115 that executes a user application 102 that communicates with the network system 110. The user operates the user application 102 to view information about the network service 110, and to make a request for service from the network system 110 for a delivery or transport service ("a trip") of the user (and, optionally, additional persons) and/or items, for example cargo needing transport. The user application 102 enables the user to specify an origin location and/or a destination location associated with the trip. An origin location and/or destination location may be a location inputted by the user or may correspond to the current location of the user client device 115 as determined automatically by a location determination module (not shown) in the user client device 115, e.g., a global positioning system (GPS) component, a wireless networking system, or a combination thereof. For purposes of simplicity, as described herein, an origin location can include a pickup location for service (i) determined by the user application 102 (e.g., based on the current location of the user client device 115 using a GPS component, (ii) specified or selected by the user, or (iii) determined by the network system 110.

According to examples herein, the user client device 115 can transmit a set of data (e.g., referred to herein as "service data") to the network system 110 over the network(s) 130 in response to user input or operation of the user application 102. Such service data can be indicative of the user's interest in potentially requesting service (e.g., before actually confirming or requesting the service). For example, the user may launch the user application 102 and specify an origin location and/or a destination location to view information about the network service before making a decision on whether to request service. The user may want to view information about the average or estimated time of arrival for pick up by a provider, the estimated time to the destination, the price, the available service types, etc. Depending on implementation, the service data can include the origin and/or destination location information, user information (e.g., identifier), application information (e.g., version number), device identifier or type, etc. According to some examples, each time the user modifies the origin and/or destination location, the user application 102 can generate and transmit the service data to the network system 110.

Once the user confirms or orders a service via the user application 102, the user application 102 can generate data corresponding to a request for the service through the network system 110 (e.g., also referred to herein as a "trip request"). Responsive to receiving a trip request, the network system 110 uses information from the trip request to match the user with one of a plurality of available providers. Depending on implementation, the trip request can include user or device information (e.g., a user identifier, a device identifier), a service type (e.g., vehicle type) and/or an origin location, a destination location, a payment profile identifier, and/or other data. The network system 110 selects a provider from a set of providers, such as based on the provider's current location and status (e.g., offline, online, available, etc.) and/or information from the trip request (e.g., service type, origin location, and/or destination location), to provide the service for the user and transport the user from the origin location to the destination location. Responsive to selecting an available provider, the network system 110 sends an invitation message to the provider client device 120 inviting the provider to fulfill the trip request.

The provider operates a client device 110 executing a provider application 104 that communicates with the network system 110 to provide information indicating whether the provider is available or unavailable to provide transportation services to users. The provider application 104 can also present information about the network system 110 to the provider, such as invitations to provide service, navigation instructions, map data, etc. In one embodiment, the provider application 104 enables the provider to provide information regarding availability of the provider by logging into the network system 110 and activating a setting indicating that they are currently available to provide service. The provider application 104 also provides the current location of the provider or the provider client device 120 to the network system 110. Depending on implementation, the current location may be a location inputted by the provider or may correspond to the current location of the provider client device 120 as determined automatically by a location determination module (not shown) in the provider client device 120 (e.g., a GPS component, a wireless networking system, or a combination thereof. The provider application 104 further allows a provider to receive, from the trip management module 140 (shown in FIG. 2), an invitation message to provide a service for a requesting user, and if the provider accepts via input, the provider application 104 can transmit an acceptance message to the trip management module 140. The trip management module 140 can subsequently provide information about the provider to the user application 102. As another embodiment, the provider application 104 can enable the provider to view a list of current trip requests and to select a particular trip request to fulfill. The provider application 104 can also receive routing information from the trip management module 140. The provider application 104 enables a provider to provide a rating for a user upon completion of a trip. In one embodiment, the rating is provided on a scale of one to five, five being the maximal (best) rating.

The user client device 115 and the provider client device 120 are portable electronic devices such as smartphones, tablet devices, wearable computing devices (e.g., smartwatches) or similar devices. Alternatively, the provider client device 120 can correspond to an on-board computing system of a vehicle. Client devices typically have one or more processors, memory, touch screen displays, wireless networking system (e.g., IEEE 802.11), cellular telephony support (e.g., LTE/GSM/UMTS/CDMA/HSDPA, etc.), and location determination capabilities. Additionally, the user client device 115 and the provider client device 120 have sensors including a Global Navigation Satellite System (GNSS) chipset, a GPS sensor, an inertial measurement unit (IMU) comprising an accelerometer and a gyroscope, and a barometer.

The user client device 115 and the provider client device 120 interact with the network system 110 through client applications configured to interact with the network system 110. The applications 102 and 104 of the user client device 115 and the provider client device 120, respectively, can present information received from the network system 110 on a user interface, such as a map of the geographic region, and the current location of the user client device 115 or the provider client device 120. The applications 102 and 104 running on the user client device 115 and the provider client device 120 can determine the current location of the device and provide the current location to the network system 110.

The beacon 125 is a wireless device located at a fixed position within the provider vehicle (e.g., coupled to the vehicle windshield or dashboard). In one embodiment, the beacon 125 includes sensors such as a GNSS, an IMU, and a barometer. Additionally, in some embodiments, the beacon 125 receives low-power, low-range beacon signals via Bluetooth or Bluetooth Low Energy (BLE) technologies or protocols. The beacon 125 is communicatively coupled through the network 130 to the network system 110 and reports sensor data to the network system 110 for use in determining a location of the vehicle and validating results of a sensor fusion algorithm used to detect specified vehicle movements. Modules of the network system 110 fuse the signals from these sensors with a GNSS signal from the provider client device 120 to generate more accurate location estimates compared to pure GNSS-based localization from the provider client device, as discussed below with respect to FIG. 2. Additionally, in some embodiments, the beacon 125 uses a rider-specified illumination output (e.g., a visual output such as a color or pattern) to allow the user and the provider to locate each other during the pickup process.

Figure 2:
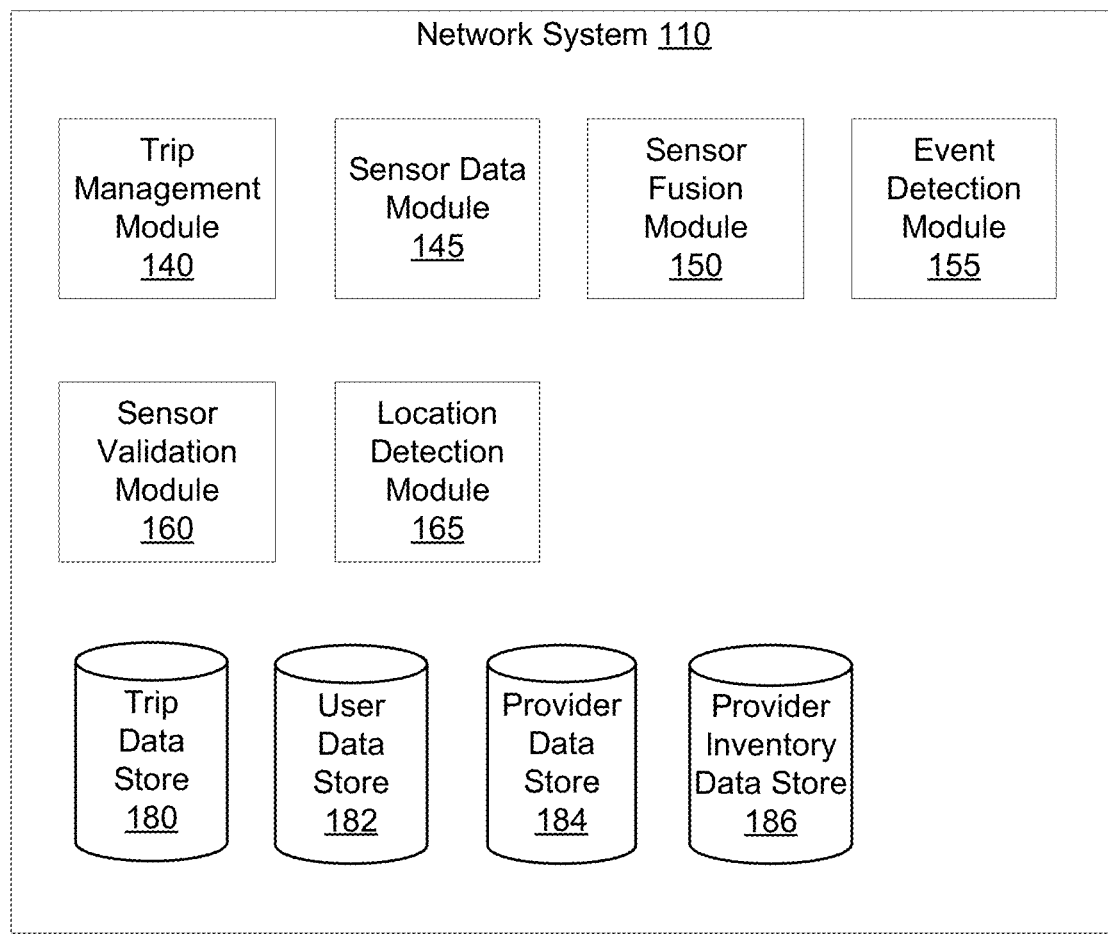
FIG. 2 is a block diagram illustrating the modules of the example network system of FIG. 1, in accordance with an embodiment.

Turning now to FIG. 2, it illustrates a system architecture of the network system 110, according to one embodiment. In the example embodiment shown in FIG. 2, the network system 110 includes a trip management module 140, a sensor data module 145, a sensor fusion module 150, an event detection module 155, a sensor validation module 160, a location detection module 165, and various data stores including a trip data store 180, a user data store 182, a provider data store 184, and a provider inventory data store 186. These modules and data stores are not native components of a generic computer system and provide structures and functions beyond generic functions of a computer system, as further described below.

The trip management module 140 is configured as a communicative interface between the user application 102, the provider application 104, and the various modules and data stores in the network system 110, and is one means for performing this function. The trip management module 140 is configured to receive provider availability status information and current location information from the provider application 104 and update the provider inventory data store 186 with the availability status. The trip management module 140 is also configured to receive trip requests from the user application 102 and creates corresponding trip records in the trip data store 180. According to an example, a trip record corresponding to a trip request can include or be associated with a trip ID, a user ID, an origin location, a destination location, a service type, pricing information, and/or a status indicating that the corresponding trip request has not been processed. According to one example, when a provider accepts the invitation message to service the trip request for the user, the trip record can be updated with the provider's information as well as the provider's location and the time when the trip request was accepted. Similarly, location and time information about the service as well as the cost for the service can be associated with the trip record.

In one embodiment, the sensor data module 145 receives sensor data (e.g., periodically) from the provider client device 120 and the beacon 125 that is used by the modules of the network system 110 to determine a location and telematics information (e.g., indications of current speed, acceleration/deceleration, stops) of the provider vehicle and to detect whether one or more specified events (such as a sudden deceleration or a sharp turn) have occurred. The sensor data module 145 stores the sensor data in the trip data store 180 and can associate the information with the trip record. In some embodiments, the sensor data module 145 periodically calculates the provider's estimated time of arrival (ETA) and provides the ETA to the user application 102.

In one embodiment, the sensor data received from the beacon 125 includes GNSS, accelerometer, gyroscope, and barometer data. GNSS receivers in the beacon 125 measure location, velocity, and associated uncertainties. These measurements can be represented as:

$$p_{gps} = p_{true} + n_p$$

$$v_{gps} = v_{true} + n_v$$

where Position, $p_{gps}$, comprises latitude, longitude, and altitude. The noise, $n_p$, is Gaussian noise $N(0, \Sigma_p)$, with zero mean and covariance $\Sigma_p$. Velocity, $v_{gps}$, is calculated across these 3 dimensions as well. The noise, $n_v$, is Gaussian noise $N(0, \Sigma_v)$, with zero mean and covariance $\Sigma_v$. The uncertainties imply that the associated signal is within uncertainty value with 68% confidence. $p_{gps}$ and $v_{gps}$ are represented in the World Geodetic System (WGS84) frame.

The GNSS receiver also provides raw GNSS measurements called pseudorange, $\rho$, and pseudorange rate, $\rho'$, that can be used to estimate position and velocity. Pseudorange measures the distance between a satellite and the receiver, while the pseudorange rate measures the doppler frequency as a function of vehicle speed. In addition to $p_{gps}$ and $v_{gps}$, shadow matching uses satellite SNR, azimuth, and elevation from the GNSS receiver to better determine location in urban areas where satellite signals become occluded by buildings.

The accelerometer data provides measurements of acceleration along X (lateral), Y (forward), and Z (vertical) axes of the sensors. In one embodiment, the accelerometer measurement is represented as:

$$a_m = a_l + g + a_b + w_a,$$

where $a_m$ is measured acceleration, $a_l$ is linear acceleration, $g$ is gravity, $a_b$ is bias, and $w_a$ is Gaussian noise. $a_l$ is the signal of interest for navigation and is used to predict speed and position between two GNSS samples ("dead reckoning"). In one embodiment, the sensor data module 145 continuously estimates measures of gravity and bias and removes the estimated measurements from $a_m$ to get a good estimate of $a_l$ because gravity depends on sensor orientation that can change over time, and because bias changes over time and temperature.

The gyroscope data measures turn rate along the x, y, and z axes of the sensor. In one embodiment, the gyroscope measurement is represented as:

$$\omega_m = \omega_s + \omega_b + w_\omega,$$

where $\omega_m$ is the measured turn rate, $\omega_s$ is actual turn rate, $\omega_b$ is bias, and $w_\omega$ is Gaussian noise. $\omega_s$ is the signal of interest for navigation and is used to derive changes in heading (i.e., the angle of the vehicle direction of motion from North). In one embodiment, the sensor data module 145 estimates a measurement of bias and removes the estimated measurement from $\omega_m$ to attain an accurate estimate of $\omega_s$. The bias changes over time and temperature. In one embodiment, with both the accelerometer and gyroscope measurements, the sensor data module 145 ignores the effect of sensitivity error and non-linearity. Additionally, in some implementations, the sensor data module 145 uses the gyroscope measurement for dead reckoning between GPS points and smoothing the GNSS receiver's heading computation. Sudden heading changes in GNSS measurements that are not consistent with the gyroscope measurement are filtered to provide a smooth heading.

The barometer data measures ambient pressure and thus serves as an indicator of the altitude of the beacon 125. In one embodiment, the barometer in the beacon 125 features root mean square noise of approximately one pascal (Pa), corresponding to eight centimeters in altitude resolution such that the estimated altitude may have an error of approximately eight centimeters.

In one embodiment, sensor data received from the provider client device 120 includes GPS and IMU measurements. GPS traces are transmitted from the provider client device 120 to the sensor data module 145 periodically (e.g., once per second). In one embodiment, the IMU sensor data comprises accelerometer and gyroscope signals, while in other embodiments (e.g., in instances where the provider client device 120 has a partial IMU), the IMU sensor data does not include gyroscope signals.

The sensor data module 145 sends the sensor data from the provider client device 120 to the sensor fusion module 150, which uses the received sensor data to determine an amount of acceleration of the provider client device 120. To do so, the sensor fusion module 150 initially determines the lateral (X), forward (Y) and vertical (Z) axes of the provider client device 120 relative to the axes of the provider vehicle by estimating a measure of gravity to align the vertical axes and resolving the forward and lateral axes. In one embodiment, the estimated gravitational force is subtracted from the accelerometer sensor data to determine an amount of acceleration caused by the vehicle. To estimate gravity, sensor fusion module 150 uses a low pass filter and Principal Component Analysis (PCA) to track the direction with the most energy in the accelerometer. Additionally, in one embodiment, the sensor fusion module 150 uses the gyroscope data measurements to rotate the estimation of gravity.

To resolve the forward and lateral directions of the provider client device 120, the sensor fusion module 150 uses sensor fusion to combine the data received from the GPS and IMU of the provider client device 120. In one embodiment, the sensor fusion module 150 uses a Bayesian framework, such as Kalman or particle filtering algorithms to fuse the sensor data. For instance, a Kalman filter (such as an extended or unscented non-linear Kalman filter) may receive the GPS and IMU sensor data as input and solve for the vehicle position and motion, e.g., using the following equation:

$$a_{x,imu} = a \sin \phi - \omega \upsilon \cos \phi + \text{noise}$$

$$a_{y,imu} = a \cos \phi + \omega \upsilon \sin \phi + \text{noise}$$

$$\omega_{imu} = \omega + \text{noise}$$

where
- $a_{x,imu}$ is the lateral (X) component of "levelled" accelerometer reading
- $a_{y,imu}$ is the forward (Y) component of "levelled" accelerometer reading
- $\omega_{imu}$ is the vertical (Z) component of "levelled" gyroscope reading
- $a$ is the Kalman filter output of acceleration
- $\upsilon$ is the Kalman filter output of speed
- $\omega$ is the Kalman filter output of turn/heading rate
- $\phi$ is the Kalman filter estimate of heading misalignment angle The sensor fusion module 150 sends the output of the Kalman filter to the event detection module 155, which uses the received data to detect whether one or more specified events have occurred. For instance, the specified events include a sudden deceleration of the vehicle (i.e., a reduction in vehicle speed by more than a threshold amount in less than a threshold period of time) or a sharp turn (i.e., a reduction in vehicle speed coupled with a change in vehicle heading by more than a threshold amount in less than a threshold period of time). For example, the event detection module 155 might detect a sudden deceleration if the vehicle speed decreases by at least ten kilometers per hour in less than a second or a sharp turn if the decrease in vehicle speed is in the perpendicular direction. Additional detected events may include sudden stops, prolonged stops (i.e., stops lasting over a threshold period of time, which might indicate, for example, that the vehicle has stopped to pick up a rider), the use of reverse gear for more than a threshold period of time or at over a threshold speed, or specified road conditions. Responsive to detecting the occurrence of one or more specified events, the event detection module 155 triggers a response flow associated with the detected event. For example, in one embodiment, the event detection module 155 queries the user and/or the provider through the client devices 115 and 120 to obtain additional information about the detected event and/or to offer assistance. Additionally, in some embodiments, the event detection module 155 may update a database record for the provider in the provider data store 184 responsive to detecting the occurrence of a specified number of detected events. For instance, repeated harsh decelerations or turns may be an indication of dangerous driving.

The sensor fusion module 150 additionally fuses the sensor data received from the beacon 125 to determine a location of the provider vehicle. In one embodiment, the signals from the GNSS, IMU, and barometer are fused in a common reference frame. Accelerometer and gyroscope measurements are in a sensor frame that aligns with the lateral, forward, and vertical axes of the sensors. Additionally, the sensor fusion module 150 uses an earth-centered, earth-fixed (ECEF) system as the navigation frame to represent a location of the vehicle in reference to Earth and uses the gyroscope to transform the measured acceleration into the navigation frame and compute the position of the vehicle.

The sensor fusion module 150 may use one of a plurality of sensor fusion architectures to fuse the sensor data received from the beacon 125. For example, in one embodiment, the sensor fusion architecture is a loosely coupled architecture in which GNSS position and velocity are used as measurements to a navigation filter that performs the sensor fusion. In an alternate embodiment, the sensor fusion architecture is a tightly coupled architecture that uses satellite pseudo-range and pseudo-range rates as inputs to the navigation filter.

In some embodiments, the sensor fusion module 150 applies additional motion constraints to reduce a likelihood of position errors in determining a location of the vehicle. For example, a threshold altitude may be applied to the barometer measurements to constrain altitude in the navigation filter (i.e., based on the assumption that, during regular forward motion, the vehicle does not slide sideways or jump upward such that the lateral and vertical velocities are zero).

The sensor validation module 160 uses sensor data from the beacon 125 to validate the vehicle movement calculated based on the sensor data from the provider client device 120. As described above with respect to FIG. 1, the beacon 125 is mounted in a fixed position (e.g., on the windshield) in the provider vehicle. Therefore, the IMU orientation and forward alignment of the beacon 125 are fixed, and the sensor validation module 160 can validate the vehicle movement based on the IMU sensor data without reliance on GPS data from the beacon 125.

To validate vehicle movement using the IMU data from the beacon 125, the sensor validation module 160 estimates gravity and subtracts the gravity estimation from the IMU data as described above. The sensor validation module 160 then performs an alignment step using PCA on the resulting data to derive the movement of the vehicle.

In one embodiment, the sensor validation module 160 performs alignment by estimating gravity at every time step and performing PCA on the residual acceleration time series. Gravity estimation may be continuously performed to account for sudden vehicle movements, while, in some embodiments, the sensor validation module 160 performs alignment of the beacon 125 relative to the vehicle less frequently (e.g., once per trip, once per day, or responsive to an indication that the beacon 125 has moved from its fixed position in the vehicle). Because the vehicle is generally moving in a forward direction, the direction determined by PCA (i.e., the direction with the most energy in the accelerometer) is aligned with the axis of forward motion. However, because the PCA can return an indication of either forward or reverse movement, the sensor validation module 160 uses gyroscope data from the beacon 125 to resolve sign ambiguity. For example, the gyroscope data projected in the direction of gravity provide turn rates in the plane of motion of the vehicle. Depending on whether the alignment analysis indicated forward or reverse movement, the sensor validation module 160 maximally correlates or anticorrelates the turn rates with the lateral accelerations due to turns. The sign of the correlation between the time series is then used to resolve the sign ambiguity and generate the direction of motion of the vehicle.

The location detection module 165 determines a location of the provider vehicle using the fused GNSS and sensor data from the beacon 125 and uses the determined location to recommend pickup and destination locations for a trip coordinated by the network system 110 and/or to generate or update an ETA of the vehicle based on the determined vehicle position. In one embodiment, the location detection module 165 uses dead reckoning to determine a vehicle location between successive GNSS samples. For example, the location detection module 165 uses a previously determined location of the vehicle based on a first GNSS sample and advances the position of the vehicle based on accelerometer data received from the beacon 125.

In one embodiment, the location detection module 165 generates pickup and destination recommendations responsive to detecting that the current location of the user client device 115 and/or a destination location input by the user through the application 102 is in area with poor GPS signals or areas where GNSS signals are unavailable (e.g., in a tunnel or urban canyon). In other embodiments, the location detection module 165 recommends pickup and/or destination locations regardless of the availability and accuracy of GNSS data. Still further, in some embodiments, the location detection module 165 generates or updates an ETA of the vehicle at a pickup location based on the vehicle location and, optionally, transmits the vehicle ETA to the user client device 115 and/or the provider client device 120.

The trip data store 180 maintains a record of each in-progress and completed trip coordinated by the network system 110. More specifically, each trip provided by a provider to a user is characterized by a set of attributes (or variables), which together form a trip record that is stored in the trip data store 180. The attributes describe aspects of the provider, the user, and the trip. In one embodiment, each trip record includes a trip identifier (ID), a user ID, a provider ID, the origin location, the pickup location, the pickup spot, the destination location, the duration of the trip, the service type for the trip, estimated time of pick up, actual time of pickup, and provider rating by user, user rating by provider, price information, market information, and/or other environmental variables as described below. In some embodiments, the trip record also includes user and/or provider feedback regarding the pickup spot. The variables for the trip record are thus drawn from multiple sources, including the user's master and usage records in the user data store 182, the provider's master and operational records in the provider data store 184, and specific variables captured and received during each trip.

The provider data store 184 stores account and operational information for each provider who participates in the network system 110. For each provider, the provider data store 184 stores one or more database records associated with the provider, including both master data and usage data. In some examples, master data for a provider includes the provider's name, provider's license information, insurance information, vehicle information (year, make, model, vehicle ID, license plate), whether the vehicle is associated with a beacon 125, a provider-specified illumination output of a beacon 125, address information, cell phone number, payment information (e.g., credit card number), sign-up date, provider service type (regular, luxury, van, etc.), device type (e.g., type of cell phone), platform type (e.g., iOS, Android), application ID, and/or application version for the provider application 104).

The provider inventory data store 186 stores provider availability status information received from the trip management module 140, including whether the provider is available for matching and the location of the provider (which gets updated periodically). When the trip management module 140 receives a trip request, the trip management module 140 determines, from the provider inventory data store 186, which providers are potential candidates to pick up the user for the newly created trip. When the network system 110 marks a trip record as complete, the network system 110 can add the provider back into the inventory of available providers in the provider inventory data store 186).

Figure 3:
FIG. 3 is an illustration of GNSS traces and sensor fusion output in a region where GNSS signals are unavailable, in accordance with an embodiment.

FIG. 3 is an illustration of GNSS traces and sensor fusion output in a region where GNSS signals are unavailable, in accordance with an embodiment. Region 300 includes GNSS traces 302 (i.e., the smaller circles overlaying the larger circles shown in FIG. 3) of a client device (e.g., the provider client device 120) as derived from a GNSS sensor of the provider client device 120. As an illustrative example, the GNSS traces were derived from client devices that are on, or directly adjacent to, a road (e.g., in the provider vehicle). Because of the existence of a tunnel within the region 300, GNSS signal data is unavailable in a portion 304 of the region 300 corresponding to the tunnel. This is evidenced by the lack of GNSS traces in the portion 304 of the region 300. If raw GNSS location data is used to determine the positioning of the vehicle inside the tunnel, the vehicle location will appear to remain at the beginning of the tunnel until the vehicle exits the tunnel.

The region 300 also includes sensor fusion output data 306 (i.e., the larger circles shown in FIG. 3) indicating locations of the provider vehicle generated based on the fused data from the beacon 125. In one embodiment, the location detection module 165 uses dead reckoning to determine a vehicle location based on IMU, GNSS, and barometer data received from the beacon 125, as discussed above with respect to FIG. 2.

Figure 4:
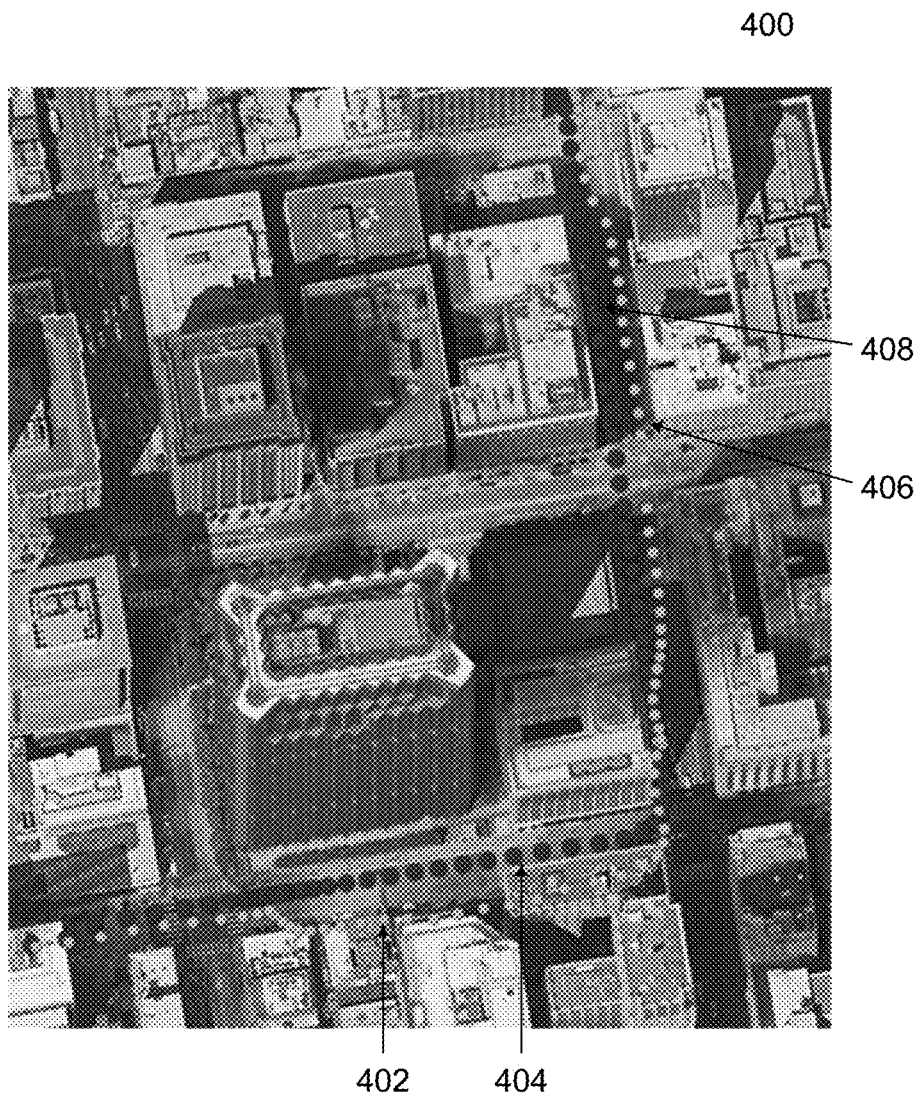
FIG. 4 is an illustration of GNSS traces and sensor fusion output in a region where GNSS signals are inaccurate, in accordance with an embodiment.

FIG. 4 is an illustration of GNSS traces and sensor fusion output in a region where GNSS signals are inaccurate, in accordance with an embodiment. The region 400 includes GNSS traces 402 of a client device (e.g., the provider client device 120) as derived from a GNSS sensor of the provider client device 120. Unlike the region 300, in which GNSS traces are unavailable, GNSS data is available in the region 400. As an illustrative example, the GNSS traces 402 were derived from client devices that are on, or directly adjacent to, a road (e.g., in the provider vehicle). Because of the existence of tall buildings within the region 400, the GNSS signals used to derive the GNSS traces are distorted and provide inaccurate GNSS traces (e.g., up to ten meters of error). This is evidenced by GNSS traces being at locations that are not on a road or are on an opposite side of the road from the location of the vehicle.

The region 400 also includes sensor fusion output data 404 indicating locations of the provider vehicle generated based on the fused data from the beacon 125. As discussed above with respect to FIG. 2, the fused sensor data from the beacon 125 provides a more accurate determination of the location of the vehicle and can be used by the location detection module 165 to generate a recommended pickup or destination location. For example, reliance solely on GNSS traces might cause the location detection module 165 to recommend a pickup location on an opposite side of the road from the actual location of the provider vehicle, such as the pickup location 406. Conversely, using the fused sensor data from the beacon 125, the location detection module 165 can recommend a pickup location on the side of the road on which the vehicle is traveling, such as the pickup location 408.

Figure 5:
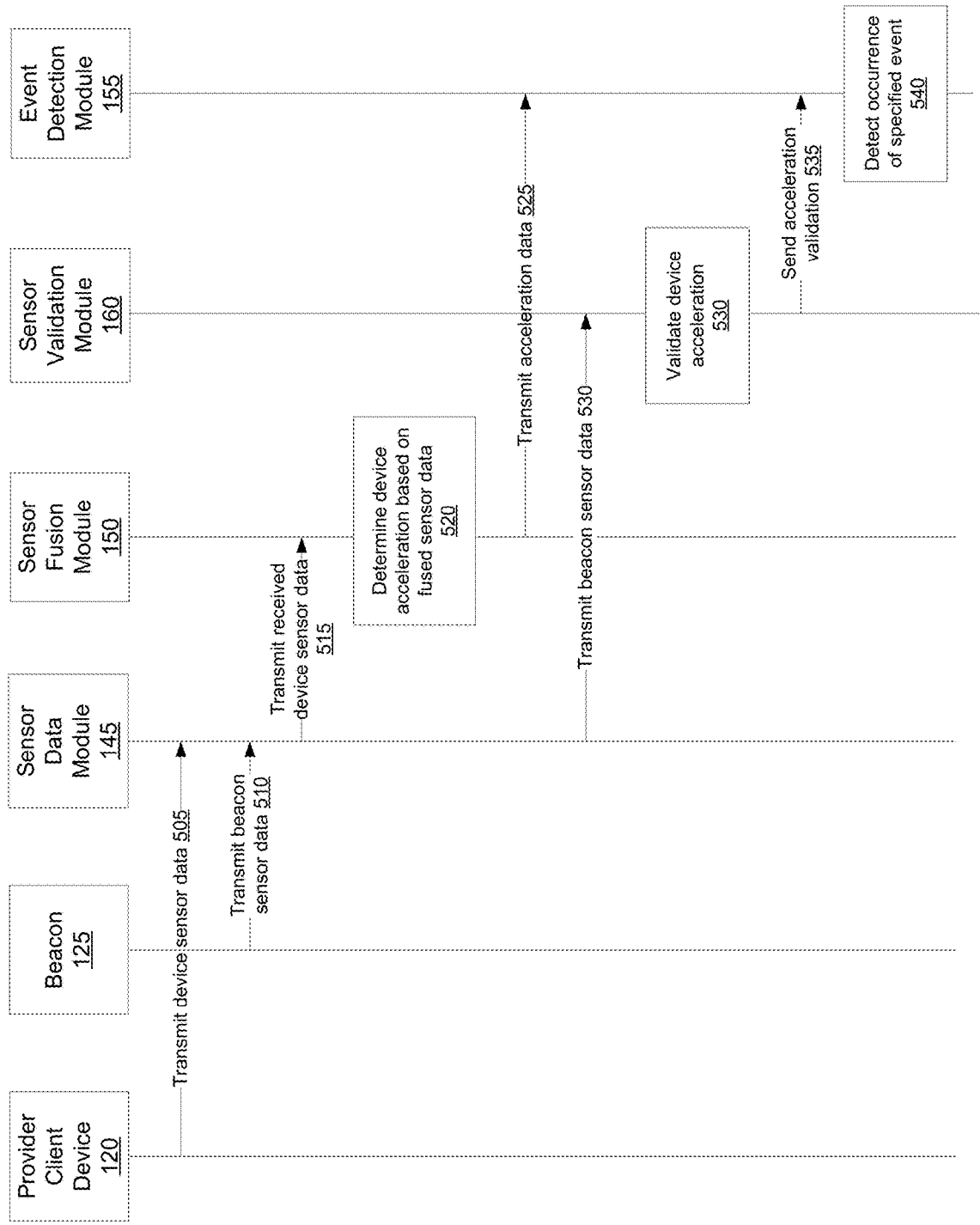
FIG. 5 is an interaction diagram illustrating a method for detecting the occurrence of one or more specified events based on device sensor data, in accordance with an embodiment.

FIG. 5 is an interaction diagram illustrating a method for detecting the occurrence of one or more specified events based on device sensor data, according to an embodiment. The steps of FIG. 5 are illustrated from the perspective of the network system 110. However, some or all of the steps may be performed by other entities or components. In addition, some embodiments may perform the steps in parallel, perform the steps in different orders, or perform different steps.

At 505, a provider client device 120 associated with a provider of a transportation service transmits device sensor data to the sensor data module 145. The sensor data module 145 stores the received sensor data in the trip data store 180 (not shown) and can associate the data with a trip record associated with the transportation service. In one embodiment, the device sensor data received from the provider client device 120 includes GPS data and IMU data comprising sensor readings from an accelerometer and a gyroscope on the provider client device 120.

The sensor data module 145 additionally receives 510, beacon sensor data from a beacon 125 associated with the provider client device 120 and mounted in a fixed position in a provider vehicle. In one embodiment, the beacon sensor data includes GNSS readings that measure location and velocity of the beacon 125, accelerometer readings that measure acceleration along forward, lateral, and vertical axes, gyroscope readings that measure turn rate along the axes, and barometer readings that measure ambient pressure and indicate an altitude of the beacon 125.

The sensor data module 145 transmits 515 the sensor data from the provider client device 120 to the sensor fusion module 150, which uses the received sensor data to determine 520 an amount of acceleration of the provider client device 120. As discussed above with respect to FIG. 2, the sensor fusion module 150 generates an estimate of gravity from the raw IMU data and subtracts the gravitational force from the accelerometer readings to determine an amount of acceleration caused by the provider vehicle and align the vertical axes of the provider client device 120 and the provider vehicle. The sensor data module 145 additionally aligns the forward and lateral axes of the provider client device 120 and the provider vehicle using sensor fusion to combine the sensor data readings received from the GPS and the IMU.

After inferring the movement of the provider vehicle along the forward, lateral, and vertical axes, the sensor fusion module 150 transmits 525 the acceleration data to the event detection module 155. Additionally, in one embodiment, the acceleration data is validated 530 using sensor data received from the beacon 125 in the provider vehicle. The sensor data module 145 transmits 530 the beacon sensor data to the sensor validation module 160, which estimates gravity from the IMU readings, subtracts the gravitational force from the beacon accelerometer data, and performs PCA on the resulting data to derive the vehicle movement. Additionally, in some embodiments, the sensor validation module 160 uses the gyroscope readings from the beacon 125 to determine a direction in which the vehicle is moving, as discussed above with respect to FIG. 2.

The sensor validation module 160 sends 535 the acceleration validation to the event detection module 155, which uses the validated acceleration data to detect 540 whether one or more specified events has occurred. For example, the specified events might include a reduction in vehicle speed by more than a threshold amount in less than a threshold period of time (e.g., a reduction of more than ten kilometers per hour in a second or less) or a harsh turn (e.g., a sudden deceleration of the vehicle in a perpendicular direction). In one embodiment, in response to detecting, based on the validated sensor data, that one or more specified events have occurred, the event detection module 155 triggers an event response flow, as discussed above with respect to FIG. 2.

Figure 6:
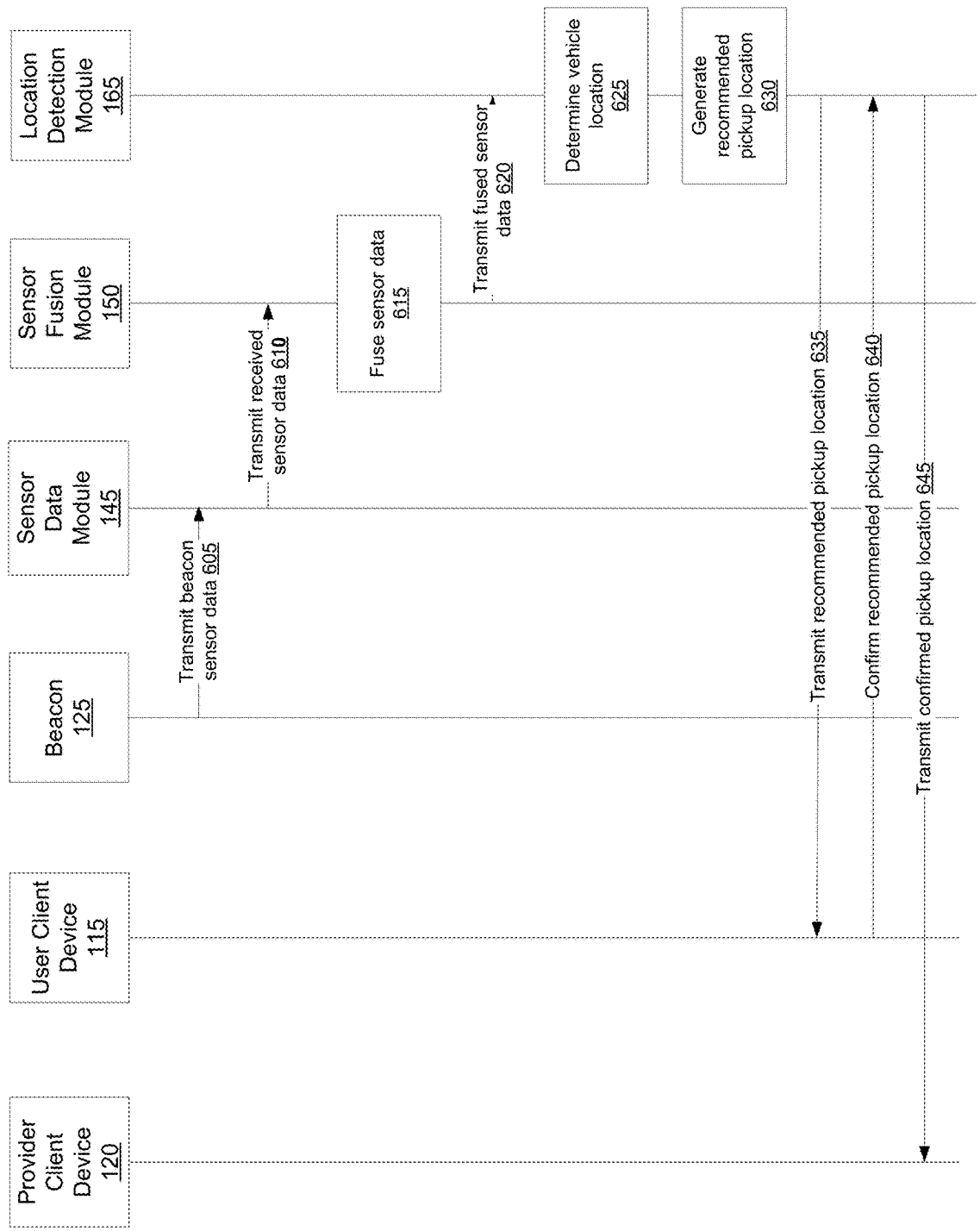
FIG. 6 is an interaction diagram illustrating a method for determining a vehicle location based on beacon sensor data, in accordance with an embodiment.

FIG. 6 is an interaction diagram illustrating a method for determining a vehicle location based on beacon sensor data, in accordance with an embodiment. The steps of FIG. 6 are illustrated from the perspective of the network system 110. However, some or all of the steps may be performed by other entities or components. In addition, some embodiments may perform the steps in parallel, perform the steps in different orders, or perform different steps.

At 605, the sensor data module 145 receives beacon sensor data from a beacon 125 mounted in a fixed position in a provider vehicle. In one embodiment, the beacon sensor data includes GNSS readings that measure location and velocity of the beacon 125, accelerometer readings that measure acceleration along forward, lateral, and vertical axes, gyroscope readings that measure turn rate along the axes, and barometer readings that measure ambient pressure and indicate an altitude of the beacon 125.

The sensor data module 125 transmits 610 the received sensor data to the sensor fusion module 150. Additionally, in some embodiments, the sensor data module 145 stores the beacon sensor data in the trip data store 180 (not shown) and can associate the sensor data with a trip record for the transportation service.

The sensor fusion module 150 fuses 615 the GNSS, IMU, and barometer readings from the beacon 125, as described above with respect to FIG. 2. In one embodiment, the sensor fusion module 150 uses a tightly coupled sensor fusion architecture using GPS raw measurements (e.g., pseudo-range rates) processed through a navigation filter (e.g., a Kalman filter). Additionally, in some embodiments, the sensor fusion module 150 uses the barometer readings to constrain an altitude of the provider vehicle.

The fused sensor data is transmitted 620 to the location detection module 165, which determines 625 a location of the beacon 125, and, consequently, the provider vehicle. In one embodiment the location detection module 165 uses dead reckoning to determine the vehicle location by advancing a previously determined location of the vehicle based on the accelerometer data. In various embodiments, the location detection module 165 uses the provider vehicle location to perform one or more functions associated with a transportation service. For example, in one implementation, the location detection module 165 generates 630 a recommended pickup location for a trip. Additionally or alternatively, the vehicle location data may be used to update an electronic map, as described in U.S. Pat. No. 10,462,610, filed on Nov. 21, 2018, which is hereby incorporated by reference in its entirety.

Figure 7:
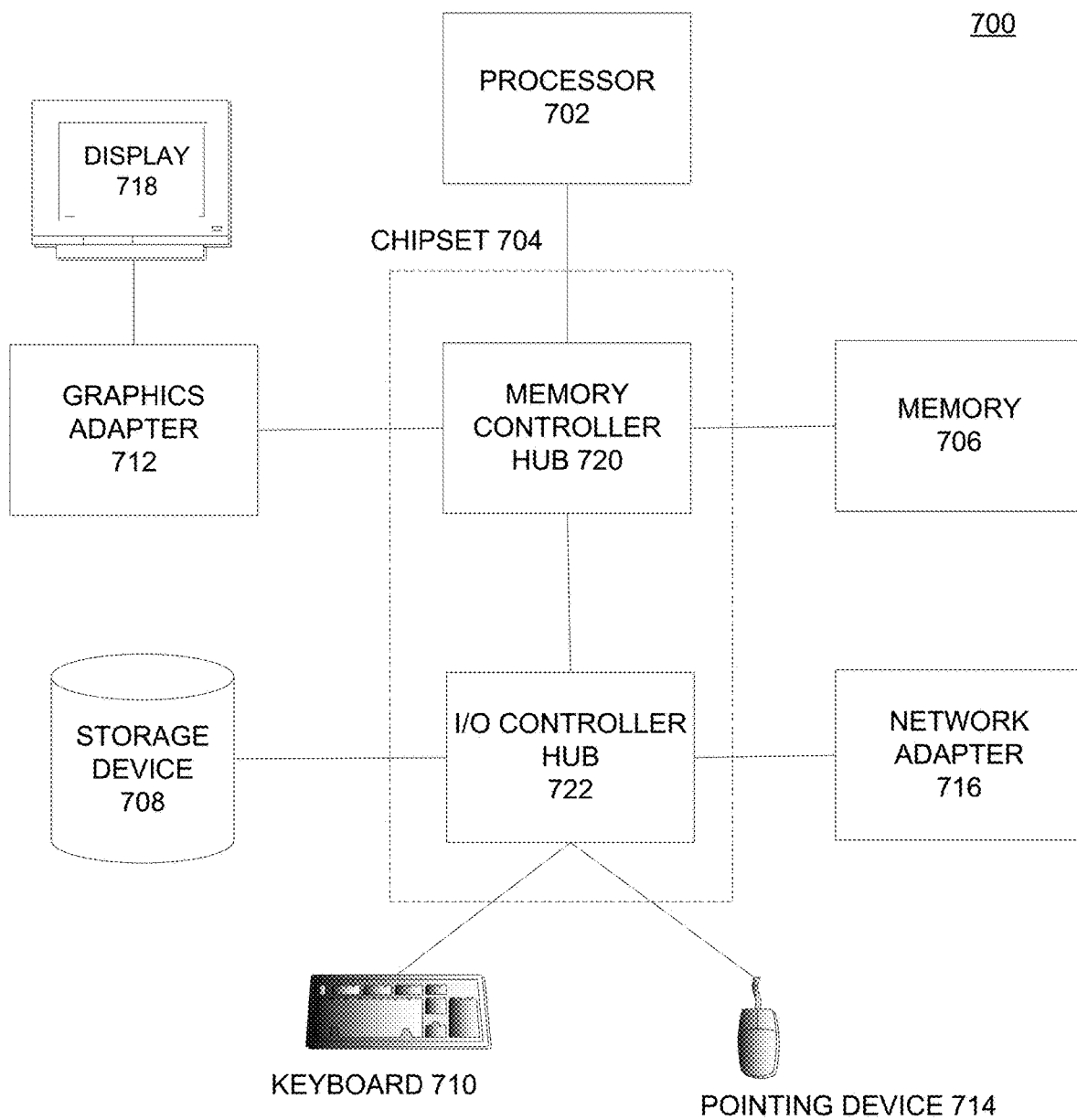
FIG. 7 is a block diagram illustrating example components of a computer used as part or all of the network system, the user client device, and/or the provider client device, in accordance with an embodiment.

FIG. 7 is a block diagram illustrating physical components of a computer 700 used as part or all of the network system 110, user client device 115, or provider client device 120 from FIG. 1, in accordance with an embodiment. Illustrated are at least one processor 702 coupled to a chipset 704. Also coupled to the chipset 704 are a memory 706, a storage device 708, a graphics adapter 712, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is any non-transitory computer-readable storage medium, such as a hard drive, compact disk read-only memory (CD-ROM), DVD, or a solid-state memory device. The memory 706 holds instructions and data used by the processor 702. The graphics adapter 712 displays images and other information on the display 718. The network adapter 716 couples the computer 700 to a local or wide area network.

As is known in the art, a computer 700 can have different and/or other components than those shown in FIG. 7. In addition, the computer 700 can lack certain illustrated components. In one embodiment, a computer 700, such as a host or smartphone, may lack a graphics adapter 712, and/or display 718, as well as a keyboard 710 or external pointing device 714. Moreover, the storage device 708 can be local and/or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations while described functionally computationally or logically are understood to be implemented by computer programs or equivalent electrical circuits microcode or the like. Furthermore, it has also proven convenient at times to refer to these arrangements of operations as modules without loss of generality. The described operations and their associated modules may be embodied in software firmware hardware or any combinations thereof.

Any of the steps, operations, or processes described herein may be performed or implemented with one or more hardware or software modules alone or in combination with other devices. In one embodiment a software module is implemented with a computer program product comprising a computer-readable medium containing computer program code which can be executed by a computer processor for performing any or all of the steps operations or processes described.

Embodiments may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory tangible computer readable storage medium or any type of media suitable for storing electronic instructions which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process where the information is stored on a non-transitory tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description but rather by any claims that issue on an application based hereon. Accordingly, the disclosure of the embodiments of the invention is intended to be illustrative but not limiting of the scope of the invention which is set forth in the following claims.

The invention claimed is:

1. A computer-implemented method for detecting vehicle movement based on fused sensor data, the method comprising:
   receiving, from a client device of a provider of a transportation service, sensor data from two or more sensors integrated into the provider client device;
   inferring an orientation of the vehicle relative to an orientation of the provider client device by:
      subtracting an estimated amount of gravitational force from sensor data from a first sensor of the provider client device to align a vertical axis of the vehicle and a vertical axis of the provider client device; and
      fusing sensor data from the first sensor and a second sensor of the provider client device to align forward and lateral axes of the vehicle and forward and lateral axes of the provider client device;
   monitoring an amount of forward acceleration of the vehicle based on the fused sensor data;
   detecting an occurrence of one or more specified events responsive to the amount of forward acceleration over a specified time period exceeding an acceleration threshold; and
   triggering a response flow, responsive to detecting the occurrence of the one or more specified events, by causing a user client device and/or the provider client device to display a query for additional information.

2. The computer-implemented method of claim 1, further comprising validating the amount of forward acceleration using sensor data received from a wireless device located at a fixed position in the vehicle.

3. The computer-implemented method of claim 2, wherein validating the amount of forward acceleration comprises:
   receiving sensor data from a sensor integrated into the wireless device;
   subtracting an estimated amount of gravitational force from the received wireless device sensor data; and
   applying a Bayesian filter algorithm to resulting sensor data measurements to determine an amount of movement of the vehicle.

4. The computer-implemented method of claim 1, wherein the first sensor comprises an inertial measurement unit (IMU) and wherein the second sensor comprises a global positioning system (GPS) sensor, the IMU including an accelerometer and a gyroscope.

5. The computer-implemented method of claim 1, wherein fusing the sensor data from the first sensor and the second sensor comprises applying a Kalman filter algorithm.

6. The computer-implemented method of claim 1, wherein the one or more specified events include a sudden deceleration of the vehicle and wherein a sudden deceleration is detected responsive to a decrease in successive acceleration measurements exceeding a specified number of miles per hour during a specified time window.

7. A system comprising:
   a processor for executing computer program instructions; and
   a non-transitory computer-readable storage medium storing computer program instructions executable by the processor to perform operations comprising:
      receiving, from a client device of a provider of a transportation service, sensor data from two or more sensors integrated into the provider client device;
      inferring an orientation of the vehicle relative to an orientation of the provider client device by:
         subtracting an estimated amount of gravitational force from sensor data from a first sensor of the provider client device to align a vertical axis of the vehicle and a vertical axis of the provider client device; and
         fusing sensor data from the first sensor and a second sensor of the provider client device to align forward and lateral axes of the vehicle and forward and lateral axes of the provider client device;
      monitoring an amount of forward acceleration of the vehicle based on the fused sensor data;
      detecting an occurrence of one or more specified events responsive to the amount of forward acceleration over a specified time period exceeding an acceleration threshold; and
      triggering a response flow, responsive to detecting the occurrence of the one or more specified events, by causing a user client device and/or the provider client device to display a query for additional information.

8. The system of claim 7, wherein the operations further comprise validating the amount of forward acceleration using sensor data received from a wireless device located at a fixed position in the vehicle.

9. The system of claim 8, wherein validating the amount of forward acceleration comprises:
   receiving sensor data from a sensor integrated into the wireless device;
   subtracting an estimated amount of gravitational force from the received wireless device sensor data; and
   applying a Bayesian filter algorithm to resulting sensor data measurements to determine an amount of movement of the vehicle.

10. The system of claim 7, wherein the first sensor comprises an inertial measurement unit (IMU) and wherein the second sensor comprises a global positioning system (GPS) sensor, the IMU including an accelerometer and a gyroscope.

11. The system of claim 7, wherein the one or more specified events include a sudden deceleration of the vehicle and wherein a sudden deceleration is detected responsive to a decrease in successive acceleration measurements exceeding a specified number of miles per hour during a specified time window.

12. The computer-implemented method of claim 1, wherein the response flow further comprises updating a database record associated with the provider responsive to detecting occurrence of a specified number of the specified events.

\* \* \* \* \*